Figure 1:
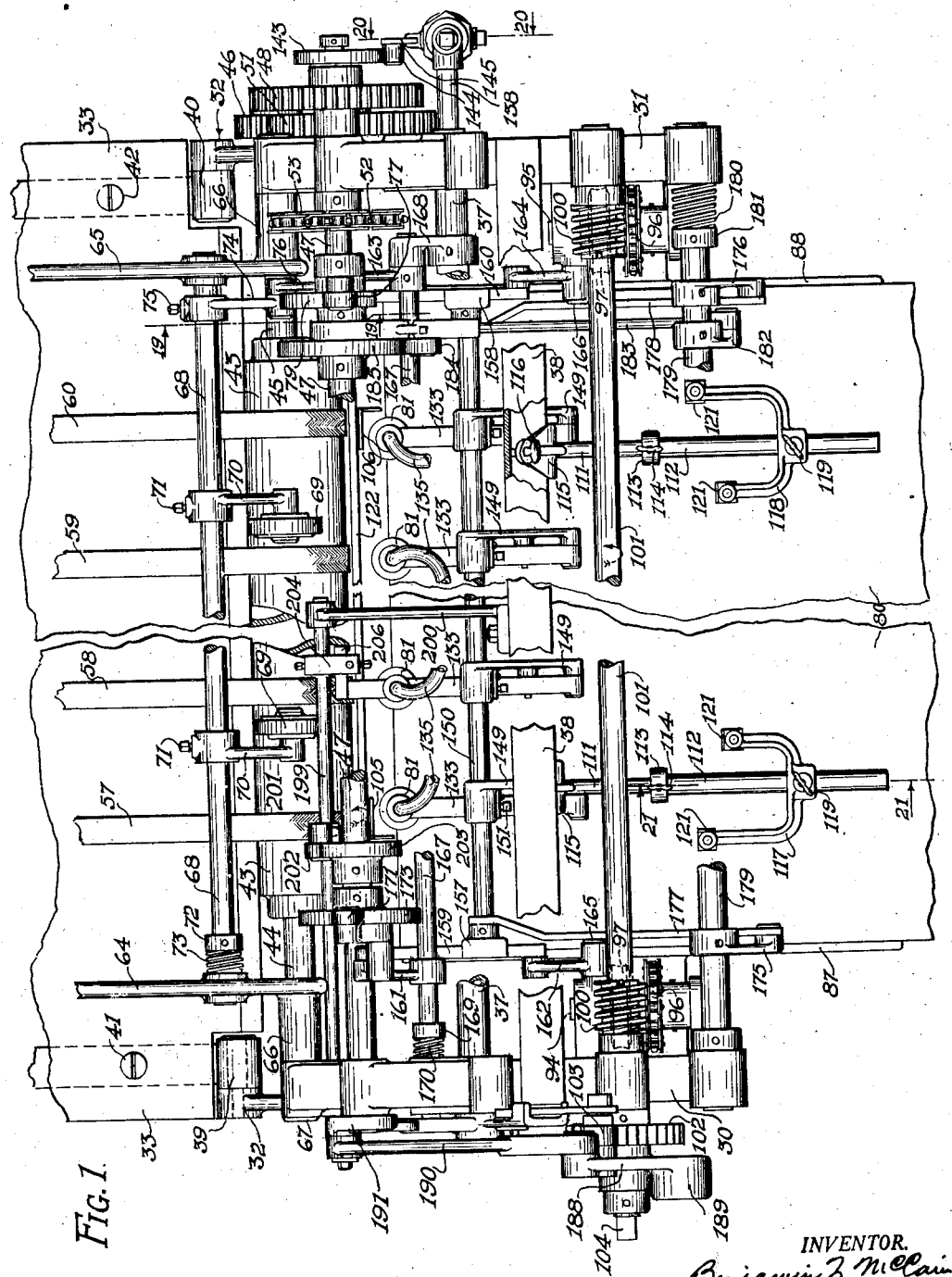

Jan. 20, 1931.  B. Z. McCAIN  1,789,826
SHEET FEEDER
Filed June 30, 1924   6 Sheets-Sheet 1

INVENTOR.
Benjamin Z. McCain
BY
H. Ferguson
ATTORNEY

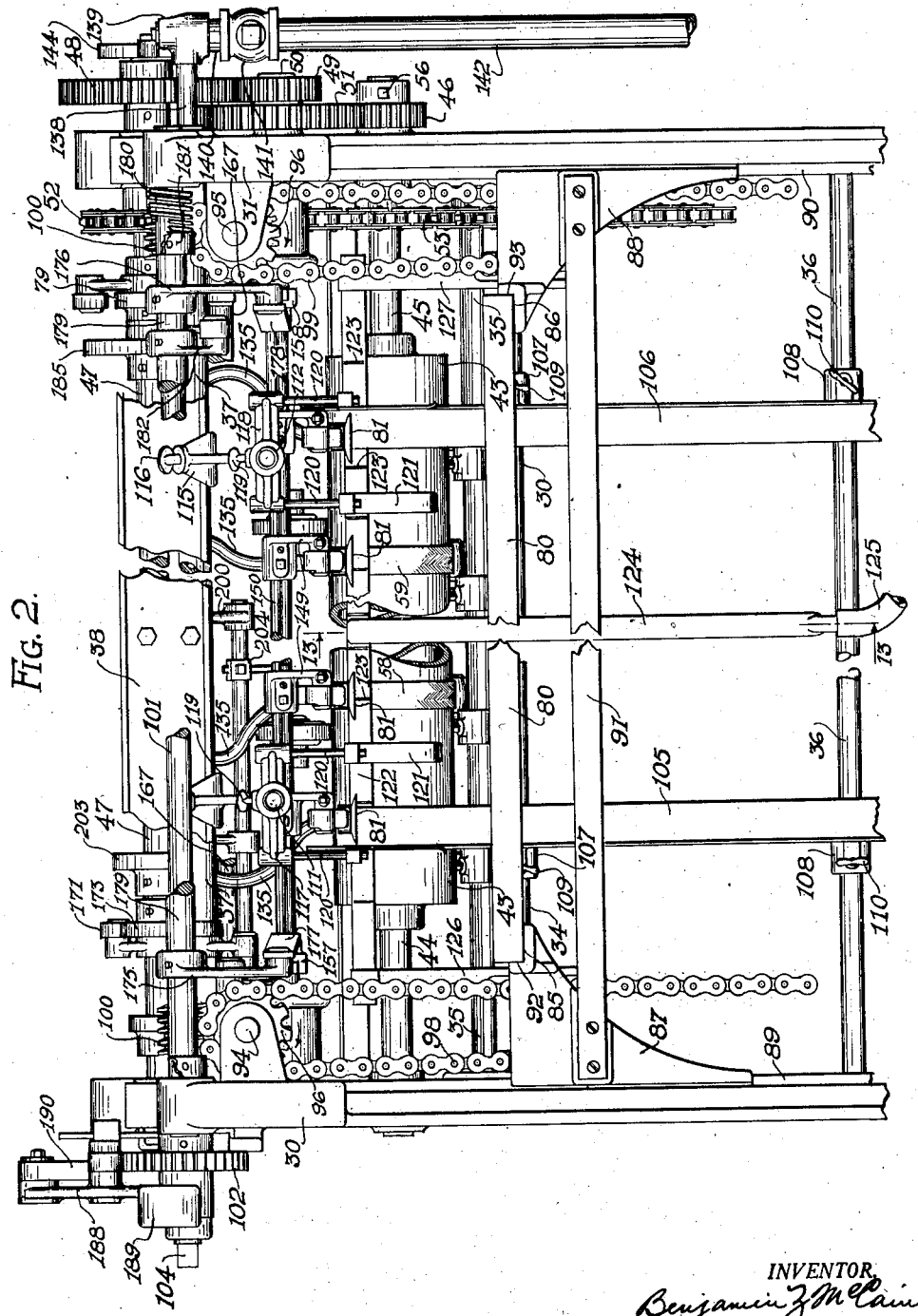

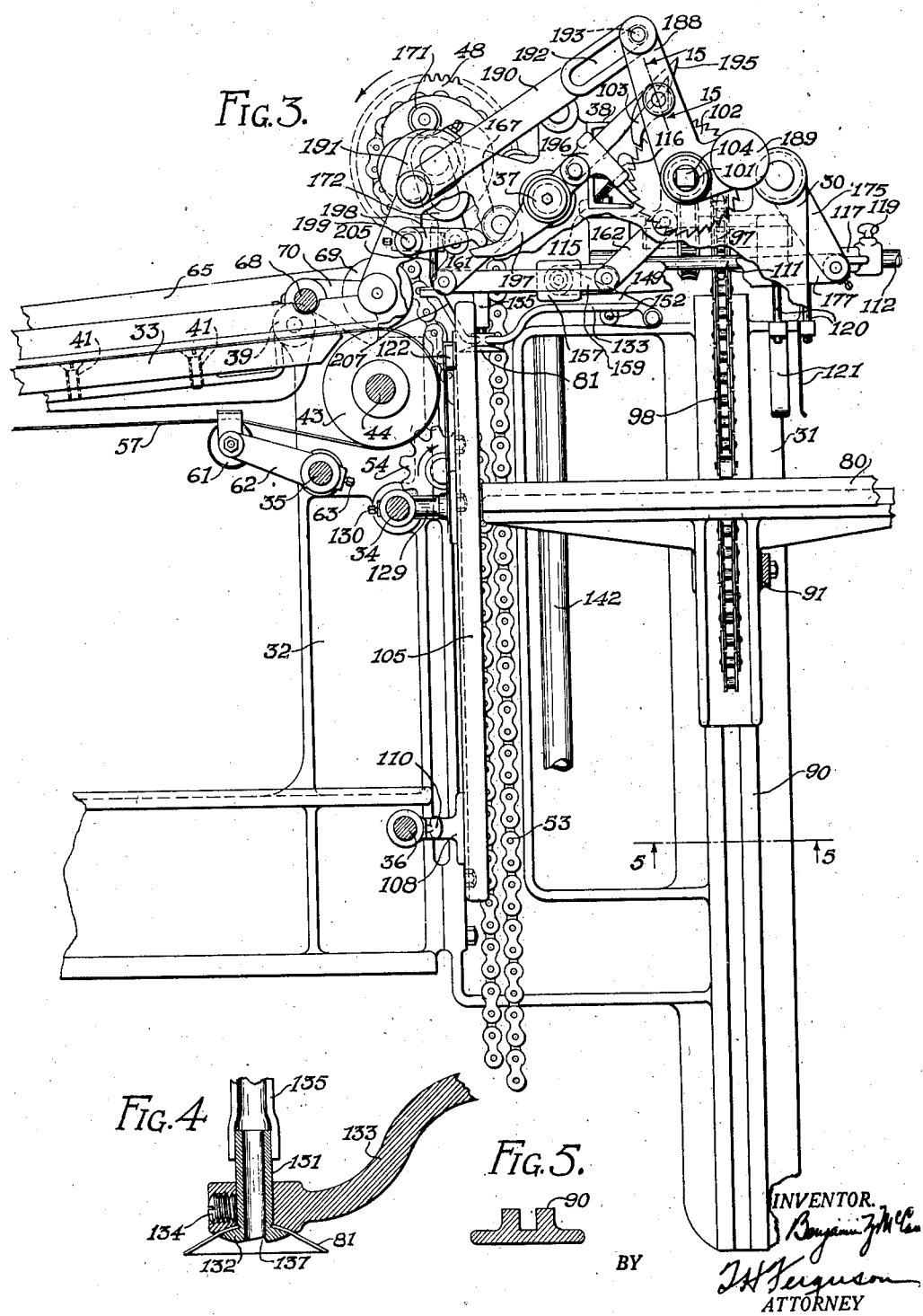

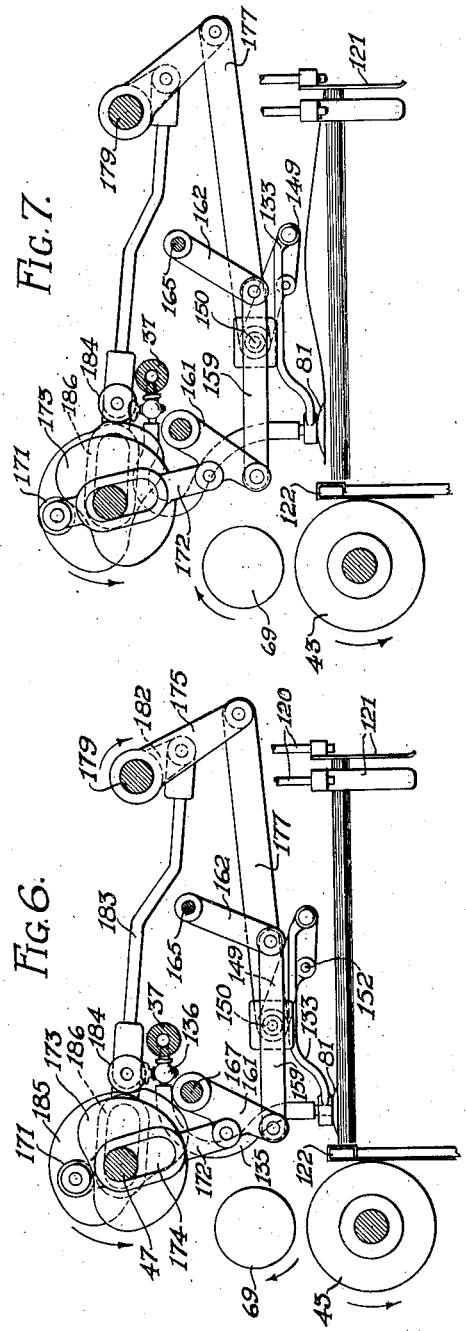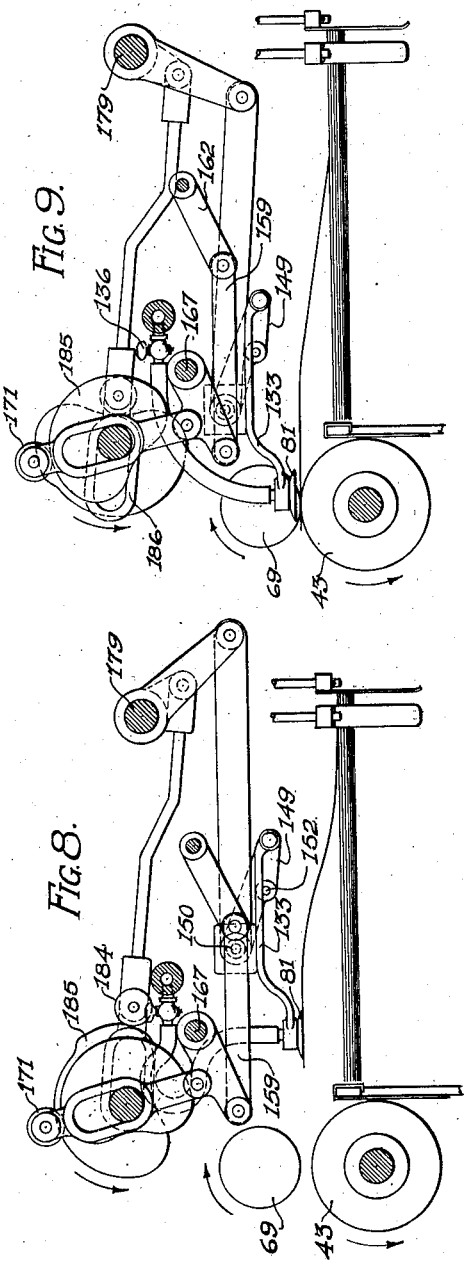

Jan. 20, 1931.   B. Z. McCAIN   1,789,826
SHEET FEEDER
Filed June 30, 1924   6 Sheets-Sheet 5

INVENTOR.
Benjamin Z. McCain
BY T. H. Ferguson
ATTORNEY

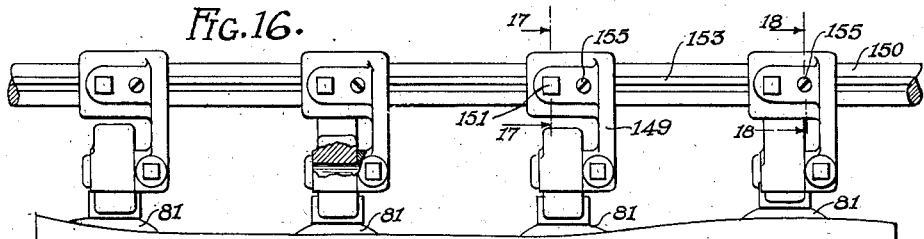
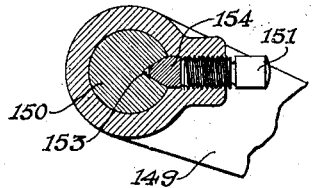
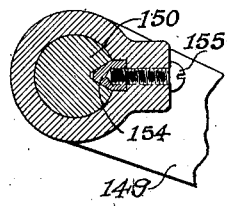
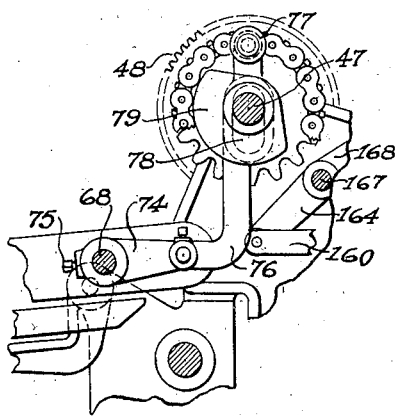
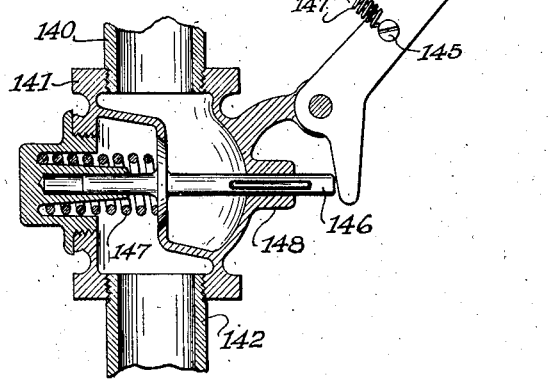
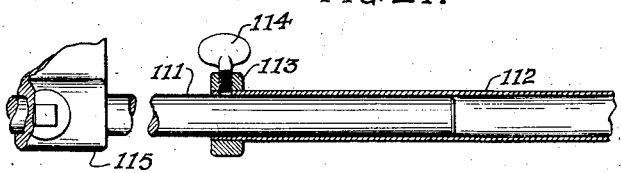

Patented Jan. 20, 1931

1,789,826

UNITED STATES PATENT OFFICE

BENJAMIN Z. McCAIN, OF OAK PARK, ILLINOIS, ASSIGNOR TO McCAIN BROS. MFG. CO., A CORPORATION OF ILLINOIS

SHEET FEEDER

Application filed June 30, 1924. Serial No. 723,196.

The present invention relates to sheet feeders generally, but has to do more particularly with the feeding of sheets of paper to a printing press and, consequently, will be described in that connection. The particular feeder herein disclosed has been built and operated in conjunction with the printing press structure of prior application Serial No. 715,286, filed May 23, 1924, Patent No. 1,621,263, dated March 15, 1927.

One object of the invention is to provide a feeder of the class described in which the suction means used for seizing and conveying the sheets are mounted in a novel way so as to fit the upper sheet of the pile, even though the same may vary in elevation at different points due to the irregular contour of the pile. In the preferred construction the several suction cups or nozzles are carried at the ends of fingers which are independently pivoted for a limited vertical movement so that the cups may adjust themselves upon the top sheet in the manner stated.

Another object is to provide a novel movement of the suction cups so as to more efficiently remove the top sheet from the other sheets of the pile. This is accomplished by giving the cups an initial backward movement by which they draw the front edge of the top sheet backward against the rear guides and in this manner bulge the sheet so that air from the blast pipe at the front of the sheet may find entrance under the same and thus more efficiently clear the sheet from the pile prior to its being carried forward to the point where it is fed to the tapes.

Another object is to provide a structure by which the raising and lowering of the cups, together with their forward and backward movements, may be efficiently accomplished. This is preferably done by mounting the cup supports upon a rocking frame in such a way that they may be reciprocated upon the frame. Then the reciprocations of the support and the oscillations of the frame are accomplished through connections with cams on a common shaft.

Another object is to provide novel guides in association with the table which carries the pile of sheets. Preferably, the rear guides have a wide range of adjustment so that sheets of a large variety of sizes may be handled by the feeder. As disclosed, the rear guides extend from the forward ends of yokes which are adjustably mounted at or near their centers upon the rear sections of telescopic supports which have their forward sections secured to a member of the machine frame.

Another object is to provide an efficient suction cup structure.

These and other objects and features of the invention will be more fully understood upon reference to the following detailed description taken in connection with the accompanying drawings, while the scope of the invention will be particularly pointed out in the appended claims.

Figure 10:
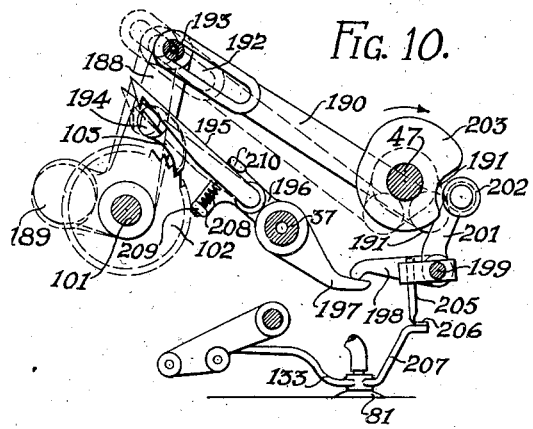
Figure 11:
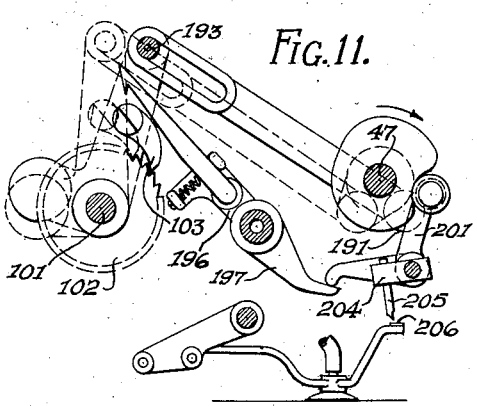
Figure 12:
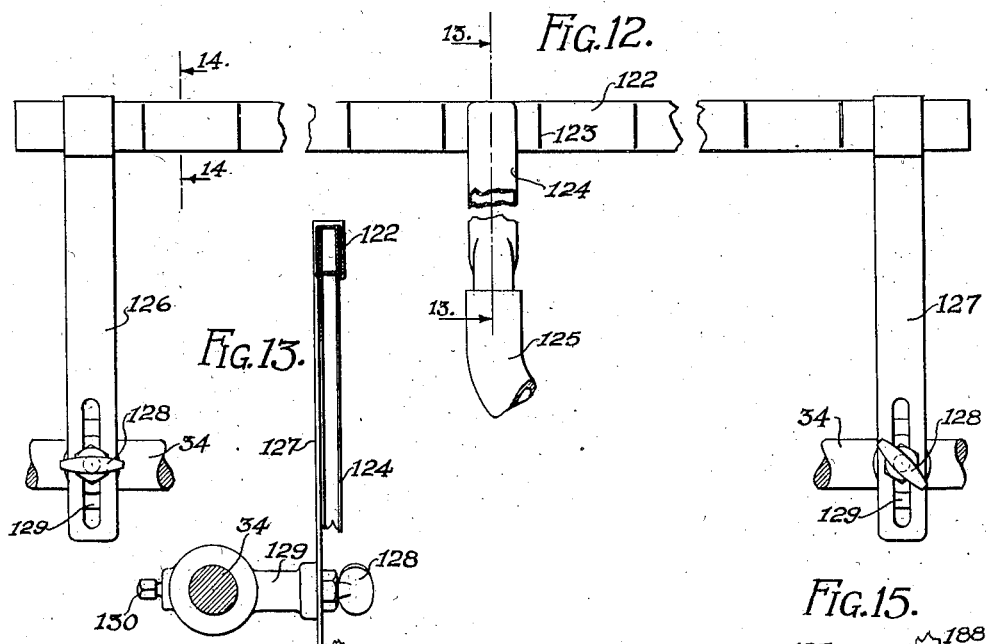
Figure 13:
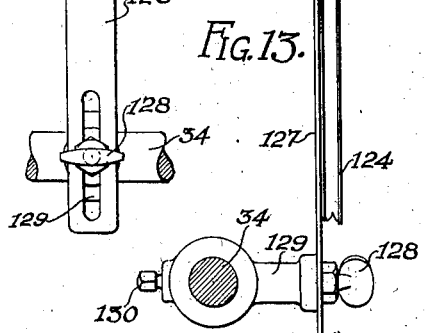
Figure 14:
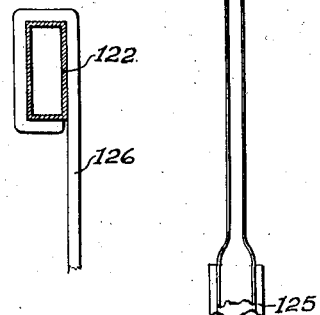
Figure 15:
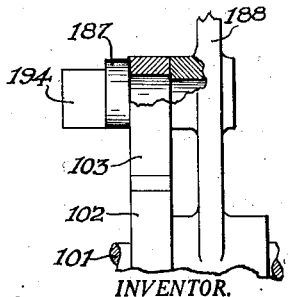

In said drawings, Fig. 1 is a plan view of a sheet feeder constructed in accordance with the present invention, parts being broken away for clearness; Fig. 2 is a rear elevation of the same, parts again being broken away for clearness; Fig. 3 is a side elevation of the same with most of the near side frame removed for clearness; Fig. 4 is a central vertical section of a suction cup and a portion of its supporting finger; Fig. 5 is a section showing the guideway of one of the side frames of the feeder, the section being taken on a plane indicated by the line 5—5 of Fig. 3; Figs. 6, 7, 8 and 9 are diagrammatic views illustrating successive positions of a suction cup and the associated mechanism by which it is operated; Figs. 10 and 11 are similarly diagrammatic views illustrating different positions of the mechanism employed in the control of the pile feed; Fig. 12 is a view illustrating the air blast pipe and its connections, parts being broken away to bring the view within the confines of the sheet; Fig. 13 is a vertical section through the air blast supply pipe and its support, the plane of section being indicated by the line 13—13 of Figs. 2 and 12; Fig. 14 is a transverse section of the blast pipe taken on a plane indicated by the line 14—14 of Fig. 12; Fig. 15 is a detail view of a portion of the pawl and ratchet mechanism by which the feed table is actuated, the plane of section being indicated by the line 15—15 of Fig. 3; Fig. 16 is an elevation of the several suction cups and their supports, illustrating the manner in which they automatically adjust themselves to the uneven surface of the top sheet of the pile, one of the cups having a portion of its support shown in vertical section; Fig. 17 is a transverse section of a portion of a cup support, the plane of section being indicated by the line 17—17 of Fig. 16; Fig. 18 is a similar section taken on a plane indicated by the line 18—18 of Fig. 16; Fig. 19 is an elevation of the cam mechanism for operating the drop rolls, certain shafts being shown in section taken on a plane indicated by the line 19—19 of Fig. 1; Fig. 20 is a vertical section of the valve by which the supply of air to the suction cups is controlled, the view also illustrating the cam and cam lever by which the valve is operated; and Fig. 21 is a vertical section through one of the guide supports, the plane of section being indicated by the line 21—21 of Fig. 1. Throughout these views like characters refer to like parts.

Referring to the drawings in detail, it will be noted that the feeder has two main side frames 30 and 31 which are connected at their forward edges to the rear of the feed board frame structure 32, which carries the feed board 33. All of this frame structure is the same as that described in the aforesaid application Serial No. 715,286. The feed board structure includes side frames which are secured together by fixed shafts 34, 35 and 36. In a similar manner, the side frames 31 and 32 of the feeder are rigidly connected by a tube 37. These side frames are also connected by a channel iron 38. Thus a rigid frame structure for the movable parts of the machine is provided.

The feed table 33 is connected by hinges 39 and 40 to the feed board frame structure 32. The forward members of these hinges extend underneath the board 33 and the latter is suitably secured thereto by screws 41 and 42. The rear edge of the board 33 approaches the tape roll 43, but sufficiently clears it so that the feed board may be rocked upward about its hinges. The roll 43 extends throughout the greater portion of the width of the feed board 33. This roll is provided with trunnions 44 and 45 which are journaled, respectively, in the side frames 30 and 31. The trunnion 45 extends beyond the side frame 31 and its projecting end is provided with a pinion 46 by which it is driven through a train of gearing from the cam shaft 47. This train of gearing includes a gear wheel 48 on the outer end of the shaft 47 meshing with a pinion 49 on a stud shaft 50 extending outward from the side frame 31. The latter in turn is provided with a gear wheel 51 which meshes with the pinion 46 upon the trunnion 45 of the tape roller. These several wheels are secured to their shafts so that as the cam shaft 47 is rotated, power is transmitted to the roller 43 to rotate it in the direction indicated by the arrow in Fig. 3. At this point it may be mentioned that the cam shaft 47 is provided with a sprocket wheel 52, and the latter is driven through the agency of a sprocket chain 53. The latter may be driven from any suitable source, and where the feeder is used upon a press of the construction shown in the prior application Serial No. 715,286, the chain 53 is driven from a driving sprocket wheel mounted upon the main frame of the press. For the purpose of guiding the sprocket chain 53, an idler 54 is located slightly below the trunnion 45, as clearly illustrated in Fig. 3. The pinion 46 is attached to the end of the trunnion 45 by any suitable means such as a set screw 56. The roller 43 is engaged by the several tapes 57, 58, 59 and 60 which travel over the upper surface of the feed board 33. In order to keep these tapes taut, idlers, such as the idler 61, are mounted upon the transverse shaft 35 so as to press upward against the tapes. As clearly shown in Fig. 3, the idler 61 is mounted on the end of an arm 62 which is provided at its opposite end with a collar which fits about the fixed shaft 35. A set screw 63, or like means, may be used for setting the arm upon the shaft and thus positioning the idler. Above the feed board 33 is a guide frame which includes members 64 and 65 which are pivotally mounted at their rear ends upon the said frames 30 and 31 respectively. In each instance the side frame is provided with a boss 66, and a pin 67 extends through the boss and through the adjacent frame member. The members 64 and 65 are also provided with bearings for the drop roll shaft 68. This shaft carries a series of drop rolls 69 which are positioned so as to come in contact with the upper surface of the long tape roll 43. Each of the drop rolls 69 is mounted on the rear end of an arm 70 which is provided with a collar at its forward end, which collar embraces the shaft 68 and is held in adjusted position by some suitable means such as a set screw 71. The shaft 68 has a collar 72 firmly secured to it, and a coiled torsion spring 73 has one end firmly secured to the collar 72 and the other end firmly secured to the member 64. The tension given this spring is such as to cause the drop rolls 69 to press downward upon the tape roll 43. The opposite movement of the drop rolls is brought about by rocking the shaft 68 against the tension of the spring 73. For this purpose the shaft 68 is provided with an arm 74 which is adjustably secured to the shaft by means of a set screw 75, or the like. The other end of the arm 74 is pivoted to the lower end of a cam link 76 which, as shown more fully in Fig. 19, has a cam roller 77 at its upper end, and is provided with a slot 78 which embraces the cam shaft 47. A cam 79 cooperates with the roller 77 and raises the link 76 upward to rock the shaft 68 against the tension of its spring 73 to thereby elevate the drop rolls 69. As clearly shown, the cam 79 maintains the rolls 69 elevated during about a half revolution of the cam shaft 47.

The sheets are fed to the tapes and drop rolls from the top of a pile which is located upon a table 80. This table is capable of vertical adjustment and is arranged to automatically travel upward so as to keep the topmost sheet of the pile in the neighborhood of the feed point to the tapes. The suction cups 81 are instrumental in seizing the topmost sheet and removing it from the pile and advancing it to the drop rolls and tape.

The table 80 rests upon ledges 85 and 86 upon vertically adjustable brackets 87 and 88 which are fitted to, and travel upon guideways 89 and 90, formed on inner faces of portions of the side frames 30 and 31 respectively. The brackets 87 and 88 are rigidly connected together by a transverse bar 91. As clearly shown in Fig. 2, the ledges 85 and 86 are provided, respectively, with shoulders 92 and 93. The table 80 fits snugly against these shoulders and, consequently, is definitely positioned with reference to the other parts of the feeder. Directly above the brackets 87 and 88 are two shafts 94 and 95 journaled in projections extending inwardly from the side frames 30 and 31, respectively. These shafts in each instance carry a sprocket wheel 96 and a worm gear wheel 97. Sprocket chains 98 and 99 are secured, respectively, to the brackets 87 and 88 and pass over the sprocket wheels 96 upon the shafts 94 and 95, respectively. The sprocket chains are of sufficient length to care for the entire vertical movement of the table 80. In the case of the chain 98, the connection to the bracket 87 is near the guideway 89, while in the case of the chain 99 secured to the bracket 88, the connection is some distance from the guideway 90. This arrangement allows the worm gear wheels 97 and their associated worms 100 to be alike. In other words, it is not necessary to use right and left hand worm gearing. The worms 100 are located upon the shaft 101 which is journaled at its opposite ends in bearings in the side frame members 30 and 31. The shaft 101 has secured to its outer end a ratchet wheel 102. This wheel is advanced by a driving pawl 103. As described more fully hereinafter, this pawl is allowed to rotate the shaft 101, or not to rotate it, in accordance with the position of the top sheet of the pile upon the table 80. It will be seen that when the pawl 103 drives the ratchet wheel 102 the worm shaft 101 will, through the worm gearing, drive the sprocket wheels 96 in the direction indicated by the arrows in Fig. 2 and thereby draw upward upon the connecting end of the chains 98 and 99 and correspondingly raise the brackets 87 and 88 with table 80. It may be noted that the ratchet wheel 102 does not need a retaining pawl but the worm gearing performs the function of such a pawl. After the table has been raised and it is desired to lower the same, the pawl 103 is thrown out of engagement with the teeth of the ratchet wheel 102 and a crank on the squared end 104 of the shaft 101 is used to rotate the latter shaft in that direction which will allow the table to descend.

When positioning the pile of sheets upon the table 80, it will be necessary to have the same accurately located with reference to the various parts which are to act upon the sheets. For this purpose I provide vertical guides. The front guides 105 and 106 are angular in section and positioned so as to engage the forward corners of the pile, one flange of each angle engaging the side edges of the sheets, and the other flange engaging the forward edges of the sheets. These guides are provided with forwardly extending brackets 107 and 108 which are provided with collars at their forward ends and associated thumb set screws 109 and 110. The collars of the brackets 108 are threaded upon the transverse fixed shaft 36. Similarly, the collars of the brackets 107 are threaded upon the fixed transverse shaft 34. By means of the set screws the brackets are firmly secured in place upon these shafts and the positions of the front guides are accurately determined. It will be noted that the adjustments for these guides are lateral only and that their position in the direction of travel of the sheets is fixed at a definite distance from the tape roller 43.

The rear guides for the pile of sheets are quite different in construction. Each guide includes a horizontally extending telescopic rod comprising a forward section 111 and a rear section 112. The rear section is tubular and is provided at its forward end with a collar 113, provided with a thumb set screw 114 by which the two section may be firmly held together in any desired adjusted position. The forward end of the forward section 111 is secured to a bracket 115 which is shaped so as to accurately fit around the lower flange of the channel bar 38. The upper portion of this bracket is adapted to extend over the lower web of the channel arm and is there provided with a thumb set screw 116. This screw is so positioned that its point engages the angle formed between the vertical web and lower flange of the channel bar 38. The rear sections 112 carry yokes 117 and 118. The other parts of the rear guide supports are identical, but these yokes are arranged one for right and the other for left hand location. The yokes 117 and 118 are apertured for the passage of the rear sections 112 and they are held in adjusted position thereon by thumb set screws 119. The forward ends of the yokes 117 and 118 carry the depending guides. These consist in each instance of an upper rod 120 and a lower leaf 121 telescopically mounted thereon. Two of these guides are positioned at the forward ends of the short arms of the yokes 117 and 118 and engage the back of the pile of sheets. The other two guides are located at the forward ends of the long arms of the yokes 117 and 118 and engage the sides of the pile. The telescopic action between the sections 120 and 121 is provided so that in case the table 80 is fed upward to such an extent that the pile of sheets upon it is low, then as the sheets are further fed off and the table is further raised, the latter will engage the lower ends 121 of the guides and shove them upward without interfering in any way with their guiding function upon the sheets of the pile. The lower leaves 121 are composed of flexible material such as spring steel and yield by engagement with the edges of the upper portion of the pile in case the latter is not accurately positioned with reference to the correct positions of the guides. They thus serve to permit the guides to be accurately set and by yielding to the irregularities of the pile allow considerable leeway for the positioning of the pile while at the same time insuring a correct guiding of the top sheet to the position required for accurate feeding to the tapes.

As the sheets are moved from the top of the pile, it is necessary to separate the top sheet from the other sheets. To assist in accomplishing this result I employ an air blast. This takes the form of a tube 122 positioned just to the rear of the tape roll 43. This tube, which is rectangular in section, is provided with a plurality of vertical openings, preferably in the form of slits 123 in the rear of the tube. Air is supplied to the tube through a supply tube 124 which is in communication with the tube 122 at one end, and provided with a flexible tubular connection 125 at its other end. The latter leads to a suitable source of compressed air. The air passing through the tubes and out through the slits directs a series of blasts against the edges of a number of sheets near the top of the pile, and acts upon them to loosen and separate them from each other. The tube 122 is secured near its ends to vertical uprights 126 and 127. These uprights are provided with slots near their lower ends, and thumb clamping screws 128 pass through these slots into the shanks of supporting members 129 which are positioned upon the transverse fixed shaft 34. The supporting members 129 have collars which fit upon the shaft 34 and are provided with set screws 130 for holding the members in proper positions upon the shaft. By means of the screws 128, it is possible to adjust the elevation of the blast pipe 122, in case it is found desirable to do so.

As previously pointed out, the suction cups 81 are employed to remove the top sheet from the pile and advance it to feeding position upon the tapes 57, 58, 59 and 60. As more particularly disclosed in Fig. 4, wherein the cup or nozzle construction 81 is shown in detail, the cup or mouth forming element itself is composed of rubber or other similar flexible material cut in the form of an annulus and slipped over a stem or rigid nozzle element 131, which is hollow and provided with an outwardly extending flange 132. The same is slipped through an aperture in the head of a supporting finger 133, and the head is shaped so as to press the adjacent portion of the cup against the upper portion of the flange 132 and thereby provide a tight fit. The stem 131 is held in place in the finger by means of a set screw 134. The upper end of the stem 131 is connected by a flexible tube 135 in each instance to a valve 136 which, in turn, is tapped into the tube 37. The lower end of the tubular stem 131 is provided with a transverse groove 137. This groove causes the sheet to buckle as it is sucked up by the suction in the stem 131. The buckling prevents the sheet from slipping away from the cup and insures a more positive holding and conveying of the same. The end of the tube 37 adjacent to the side frame 30 is plugged up. The other end of the tube is connected by a nipple 138, an elbow 139, and a nipple 140, to a valve 141. The latter, in turn, is connected to a supply pipe 142 which leads to a suitable pump or other exhausting means. In operation, the suction is supplied to the tube 37 and its connections during appropriate intervals through the agency of a cam 143 on the cam shaft 47 cooperating with the cam roller 144 on a lever 145 which engages the stem 146 of the valve 141, as more particularly shown in Fig. 20. The roller 144 is normally pressed against the cam 145 by reason of the pull of a spring 147[1] connected between the lever 145 and some fixed portion of the machine. Normally, the valve 141 is closed by the spring 147 bearing against the valve proper and forcing it upon its seat. Whenever the cam roller 144 is forced outward from the axis of the shaft 47 by the cam 143, the valve stem 146 is pushed inward against the compression of the spring 147 and in this way the passage through the valve is opened. At this time the suction is applied to the cups and they, by reason of their resting upon the top sheet, securely grip the same. This gripping action continues until the cups have moved to the point where the sheet is to be delivered. At this time the cam 143 has reached the point where the valve closes and cuts off the exhaust. When this point is reached, air escapes from the cups and their connections through a slot 148 cut in the stem 146 and cooperating with the adjacent wall of the body of the valve. Whenever the cam moves to open the valve 141, the slot 148 is moved to cut off the exhaust opening and, consequently, the full effect of the exhaust furnished from the pump or other means produces its full effect at the cups.

As previously noted, each suction cup or nozzle 81 is mounted upon a finger 133. Each of these fingers is pivoted at its rear end to a rearwardly extending arm 149. Each arm 149 is provided at its forward end with a collar which fits upon a non-rotatable shaft 150. Set screws 151 serve to hold the arms 149 in proper position. Each arm 149 has extending laterally from it a pin 152 which limits the downward movement of the associated finger 133. By means of these pins the cups 81 will, when unrestrained, come to a common level by reason of their fingers 133 engaging each with its associated stop pin 152. However, when the pile of sheets rises above this level, then the cups are free to adjust themselves to the higher elevation of the top sheet. Not only is this true, but if the elevation of the top sheet varies from point to point across the pile, in the manner illustrated in Fig. 16, then the several cups 81 will rest upon the top sheet at the different elevations and thereby insure good engagement for each cup with the resulting advantage of a better lifting force and consequent handling of the sheet. The mounting of the arms 149 upon the shaft 150 is illustrated more particularly in Figs. 16, 17 and 18. As there shown, the shaft 150 is provided with a longitudinal, wedge-shaped groove 153 which is adapted to receive a series of feathers 154, one feather being associated with each arm 149. The feather 154, in each instance, is secured to the collar of the arm 149 by a screw 155. At another point in the length of the feather 154 it is pressed home into the groove 153 by the screw 151. By the latter screws the several cups may be adjusted longitudinally of the shaft 150. The shaft 150 is mounted at its ends in boxes 157 and 158 which are fitted to travel forward and back upon links 159 and 160, respectively. Link 159 is pivoted at its ends to upwardly extending cranks 161 and 162. The link 160 is in like manner connected to links 163 and 164. Link 162 is connected at its upper end to a pin 165 which extends inwardly from an extension of the side frame 30. In like manner, link 164 is connected at its upper end to a pivot 166 extending inwardly from an extension of the side frame 31. The forward links 161 and 163 are connected at their upper ends to a transverse shaft 167. At one end this shaft is journaled in a bearing in the side frame 30. At the other end it is journaled in a bearing at the lower end of an arm 168 which is secured at the upper end to the fixed transverse tube 37. The shaft 167 is provided with a collar 169 which is fixed to it. A coiled torsion spring 170 is fixed at one end to the collar 169 and at the other end to a portion of the side frame 30. The torsion in the spring 170 is such as to maintain the cam wheel 171 upon the connecting link 172 in constant engagement with the cam 173 upon the cam shaft 47, the link 172 being connected to an intermediate point of the link 161. The link 172 is provided with a slot 174 through which the cam shaft 47 passes. It will be seen that this cam mechanism will tend to rock the links 161, 162, 163 and 164 about their upper pivotal connections and thereby raise and lower the horizontal links 159 and 160, and thus carry the cup supporting shaft 150 up and down. It is by means of this cam mechanism that the cup is raised to lift the topmost sheet and again lowered to engage the next sheet. The forward and backward movement of the cup supporting shaft 150 is provided by the cranks 175 tnd 176 and their associated links 177 and 178. The cranks 175 and 176 are mounted on a transverse shaft 179 which is journaled at its ends in bearings in the side members 30 and 31. The shaft 179 is provided with a torsion spring 180 which operates between a fixed point in the frame 31 and a collar 181 fixed to the shaft 179. The effect of the torsion spring 180 is to rotate the shaft 179 in the direction indicated by the arrow in Fig. 6. In other words, the tendency of the torsion spring is to force the cup supporting shaft 150 forward. The movement of the latter is controlled by a crank 182 secured to the shaft 179, operated through a connecting rod 183 by a cam wheel 184 engaging a cam 185 upon the cam shaft 47. The connecting rod 183 is provided with a slotted extension 186 through the slot of which the cam shaft 47 extends. These slotted links and extensions in all cases are for the purpose of guiding the associated parts.

An inspection of Figs. 6, 7, 8 and 9, which show successive positions of the parts as the sheet is being handled, will make the operation clear. The parts are in the position of Fig. 6 at the beginning of the operation of handling a single sheet. In this position, suction is applied to the cups 81 and the air blast is applied through the orifices 123 of the blast pipe 122. The suction causes the cup to firmly seize the top sheet and the air blast assists in separating that sheet from its companions. The cams 173 and 185 combine to move the parts from the position of Fig. 6 to that of Fig. 7. In the latter position we see that the upper sheet is raised.

We also see that the cup has been retracted from the position of Fig. 6 and an upward bulge produced in the upper sheet. The backward movement of the cup 81 forces the sheet backward against the guides 121. This tends to bulge the sheet, and the air forced under the sheet by the blast pipe 122 causes the sheet to bulge upward as indicated. Such action clearly separates the top sheet from its companions. This is quite an important operation as it often happens that when a number of sheets are piled and then cut, the adjacent edges where the cutting has taken place are likely to bind together. The cam action next moves the part to the position illustrated in Fig. 8. In this position the cups have been considerably elevated and are ready to be advanced to the feeding position. The continued cam action brings the parts to the position of Fig. 9, where the suction is cut off, and the sheet is fed between the tape roll 43 and the drop rolls 69, and is thereby advanced on to the tapes and carried forward to the press. It will be noted that the cups 81 and fingers 133 are not in alignment with the drop rolls 69 and, consequently, do not interfere with those rolls. The cups passing between the drop rolls draw the sheet between the latter and the tape roll 43. At the proper time the cam 79 causes the drop roll 69 to engage the sheet and advance it. It will be seen that the cups may be adjusted to suit the size of the sheets being fed. If any cup is not needed, the valve 136 associated with it may be closed and the cup in this way will be put out of service. Obviously, too, the front guides 105 and 106, and the rear guides 121, may be adjusted to suit the size of the sheets being handled. The continued cam action then brings the parts from the position of Fig. 9 back to the final position of Fig. 6 where the cycle of operations is repeated in connection with a new sheet.

It now remains to consider the pile feed control. As before noted, the gradual elevation of the table 80 is brought about by the step by step advances of the ratchet wheel shaft 101 due to the action of the driving pawl 103 upon the ratchet wheel 102. The pawl 103 is mounted upon a pin 187, shown more particularly in Fig. 15, which extends laterally from the arm 188 which is mounted for oscillation upon the shaft 101. The arm 188 is provided with a weight 189 which tends to move it counter-clockwise as the parts are viewed in Fig. 10. In other words, this weight tends to move the arm 188 so that the pawl 103 will slip back over one or more teeth of the ratchet wheel 102 preparatory to rotating the shaft forward through another step. The forward movement of the arm 188, which brings about such forward step of the ratchet wheel 102 and shaft 101, is accomplished by a connecting link 190 and an associated crank 191 upon the cam shaft 47.

The link 190 is provided with a slot 192, which is free under certain circumstances to ride over the pin 193 upon the arm 188. The arrangement is such that whenever the arm 188 is moved backward so as to set its pawl in position for a new forward step, the link 190 will draw upon the pin 193 and bring about such advance. However, if the arm 188 be held in its forward position, then the subsequent rotations of the crank 191 and resulting reciprocations of the link 190 will have no effect upon the arm 188, as the pin 193 will simply pass to and fro in the slot 192. For the purpose of holding the arm 188 in its forward position and thus prevent its assuming a feeding position, the pin 187 is provided with an angular end 194 and a hook 195 is arranged to cooperate with the end 194 to hold the arm in its forward position whenever the pile of sheets upon the table 80 is high enough and the table does not need to be further elevated. The hook 195 is pivotally mounted on a lever 196 which is journaled at an intermediate point upon the tube 37 and has an operating end 197 extending forward and downward from the latter. This end is adapted to be engaged by an arm 198 secured to a rock shaft 199 which is journaled at one end in the side frame 30 and at the other end in a bearing at the outer end of a bracket 200 which is secured at its rear end to the channel bar 38. The rock shaft 199 is adapted to be oscillated by an arm 201 which is secured to it and at its free end carries a cam roller 202 which bears upon the periphery of a cam 203 secured to the cam shaft 47. The cam 203 is provided with a depression which, when the table needs to be elevated, allows the arm 198 to press down upon the end 197 of the lever 196 to raise the hook 195 out of position to engage the angular pin 194. This depression in the cam brings about this action just at the time the arm 188 has reached its foremost position and is ready to return to the beginning of a new step. For the purpose of controlling the rock shaft 199 and preventing the depression in the cam 203 from bringing about this withdrawal of the hook from engaging position, the shaft 199 is provided with a rearwardly extending bar 204 from the outer end of which extends a pin 205. The latter is adapted to engage the lateral projection 206 on an extension 207 of one of the suction fingers 133 whenever the pile of sheets is of sufficient height and it is unnecessary to elevate the table. As will be seen, the elevation of the extension 207 and its lateral projection 206 determines whether or not the shaft 199 shall be oscillated by the cam roller 202 entering the depression in the cam 203. The elevation of the projection 206 is of course determined by the height of the pile upon which the associated cup 81 rests. When the projection 206 engages the pin 205 and thus prevents the roller 202 from falling into the depression and cam 203, the arm 198 and lever 196 will remain in the position indicated in Fig. 10. In this position, the arm 188 is advanced to the extent of its foremost stroke and is about to return. In doing so, the point of the angular end 194 upon the pin will engage the point of the hook 195, and as the arm 188 recedes still further the hook and pin will come into close and intimate contact, as indicated by the dotted line position of Fig. 10. It is at this time that the spring 208 comes into play. This spring acts between a lug 209 on the member 196 and the hook 195. A similar lug 210 is positioned so as to engage the opposite side of the member 195. When the cam roller 202 drops into the depression in the cam 203, the parts will assume the position illustrated in Fig. 11. As previously pointed out, when the ratchet wheel 102 is advanced, the shaft 101 is rotated and through the worm gearing the sprocket wheels 96 rotate to draw upon the sprocket chains 98 and 99 and thus elevate the brackets 87 and 88 and the table 80 supported thereby.

It will be apparent that in carrying out my invention certain alterations and modifications may be made without departing from the spirit and scope of the same. I therefore do not wish to be limited to all the details herein disclosed, but aim to cover all alterations and modifications which come within the spirit and scope of my invention by the terms of the appended claims.

What I claim as new and desire to secure by a patent of the United States is:—

1. A sheet feeder including a table for holding a pile of sheets, a supporting arm extending in the direction of feed of said sheets, a finger pivoted at its rear end to said arm and extending forward in the direction of said feed, a stop on said arm for engaging said finger to limit its downward movement, a suction cup at the forward end of said finger, a flexible suction connection to said cup, means for shifting said arm, finger and cup in the operation of advancing the sheets, and means for controlling the suction through said pipe in timed relation with the operations of said shifting means.

2. A sheet feeder including a table for holding a pile of sheet, a series of supporting arms extending in the direction of feed of said sheets, fingers pivoted respectively at their rear ends to said arms and extending forward in the direction of said feed, stops on said arms to limit their downward movements independently to allow them to adjust themselves to the irregular surface of the topmost sheet of the pile, a suction cup at the forward end of each finger, flexible suction connections with said cups, means for shifting said arms, fingers and cups to forward the sheets, and valve means for controlling the suction in timed relation with the operations of said shifting means.

3. A sheet feeder including a table for holding a pile of sheets, a series of pivotally mounted fingers whose ends are independently free to rise and fall through a limited movement relative to said pile of sheets, suction cups upon the ends of said fingers, flexible suction connections to said cups, and means for operating said fingers and cups to feed sheets from said pile.

4. In a machine of the class described, a suction cup structure comprising a finger terminating in a head having a vertical opening through it, a hollow stem extending through said opening, an outwardly extending flange at the lower end of said stem beneath the finger head, a flexible annulus secured at its inner edge between said flange and head and extending downwardly and outwardly to a plane below said flange to form a cup, the flanged end of said stem being transversely grooved at its inlet opening to assist in firmly gripping the sheet for lateral movement when once drawn up by the suction through the cup, and a suction connection to the upper end of said stem.

5. A sheet feeder including a table for a pile of sheets, suction means for engaging the top sheet of the pile, a support for said suction means, a guide member at the rear of the sheets, cam actuated means for moving said support forward and back in the direction of the travel of the sheet when being fed, cam actuated means for elevating and lowering said support relative to said pile, said support having sliding engagement with said elevating and lowering means, said combined forward and back and elevating and lowering movements serving to force the top sheet against said guide member to bulge the same upward from the sheet below it and then advance it to the feeding position, suction connections for said suction means, and a control for said suction connections operating in timed relation to both of said cam actuated means to bring about said sheet bulging and feeding movements.

6. A sheet feeder including a table for holding a pile of sheets, suction cups for engaging the top sheet of the pile, a support to which said cups are pivotally connected for vertical movement, guides along which said support is movable in the direction of feed, means for reciprocating said support along said guides, means for moving said guides up and down to different parallel positions, an abutment member rearward of the pile of sheets positioned to be engaged by the topmost sheet as it is being carried rearward by said cups to bulge said sheet from the sheet below it to admit a volume of air between the sheets just prior to the advance of the topmost sheet, suction connections for said cups, a cam shaft, and means actuated thereby to control the operations of said reciprocating means, moving means and suction connections.

7. A sheet feeder including a table for holding a pile of sheets, suction cups for engaging the top sheet of the pile, a supporting shaft to which said cups are pivotally connected for vertical movement, parallel guide links at the ends of said shaft, boxes reciprocable on said links in which boxes the ends of the shaft are mounted, pivoted arms by which said guide links are supported, a cam and connecting link by which said arms are rocked to raise and lower said guide links, a crank rearward of said supporting shaft, a link connecting said crank and supporting shaft, and a cam and connecting link by which said crank is oscillated to reciprocate said boxes on said guide links and thereby move said supporting shaft and cups forward and back.

8. A sheet feeder including a table for holding a pile of sheets, parallel guide links near and above the lateral edges of said table, a pair of pivoted links for supporting each of said guide links, boxes mounted for reciprocation on said guide links, a supporting shaft secured at its ends to said boxes respectively, a crank shaft to the rear of said supporting shaft, a cam shaft above and forward of said supporting shaft, a link and cam on said cam shaft for oscillating said crank shaft, connections between said boxes and the cranks on said crank shaft to reciprocate said supporting shaft as said cranks oscillate, a link and cam on said cam shaft for rocking said pairs of pivoted links to raise and lower said guide links, and suction means for engaging the top sheet of the pile secured to said supporting shaft and movable in operation upon the sheet in accordance with the movements of said supporting shaft.

9. A sheet feeder including a frame, a rearwardly extending telescopic support secured at its forward end to a transverse member of said frame and adjustable therealong, means for clamping the sections of said support together in different adjusted positions, a horizontally disposed yoke secured near its center to the rear section of said support and adjustable therealong and having its ends projecting forward, and depending guides secured at their upper ends to the ends of said yoke.

10. A sheet feeder including a frame having a transverse member, a sheet holding table below said member, two telescopic supports extending rearward from said member, the forward end of the forward section of each telescopic support being connected to said transverse member for adjustment therealong, means for clamping the sections of the telescopic supports in different adjusted positions, a horizontally disposed yoke secured near its center to the rear section of each telescopic support and being adjustable therealong, the ends of the yokes extending forward, and a pair of depending guides for each yoke, one guide being secured at each of the forward ends of said yokes, two of the guides serving to engage the rear of a pile of sheets on the table and two serving to engage the same on opposite sides adjacent to its rear edge.

11. A sheet feeder including a frame, a transverse shaft secured at its ends to members of said frame, vertical guides secured to said shaft so as to be adjustable therealong, and a horizontal table having its forward edge just rearward of said guides, said guides being angular in cross section to engage the pile at its forward corners to position the same.

In witness whereof, I hereunto subscribe my name this 27th day of June, 1924.

BENJAMIN Z. McCAIN.